INVENTOR.
GEORGE R. BRIGGS
BY
Carl V. Olson
Attorney

INVENTOR.
GEORGE R. BRIGGS
BY
Carl V. Olson
Attorney

United States Patent Office 3,344,415

Patented Sept. 26, 1967

3,344,415

MAGNETIC SHIFT REGISTER

George R. Briggs, Princeton, N.J., assignor to Radio Corporation of America, a corporation of Delaware Filed May 27, 1965, Ser. No. 459,385
7 Claims. (Cl. 340—174)

This invention relates to magnetic shift registers, and to electromagnetic circuits useful therein.

It is a general object of this inveniton to provide an improved electromagnetic circuit capable of high speed operation and having an improved signal amplitude characteristic in the transfer of information from one circuit to another similar circuit, as in a magnetic shift register.

In accordance with an example of the invention, there is provided a magnetic shift register including two magnetic cores A and B for each information bit. Each core has two information-indicating magnetic states in one of which equal, and in the other of which, differential magnetic fluxes surround the two apertures in the core. Information transfer windings each include a conductive path extending in different directions through the two apertures of a core and in different directions through the two apertures of a following core. Information is transferred from B cores to respective next-following A cores by applying an electrical transmit pulse in the same direction through the two apertures of B cores, by applying an opposite-polarity electrical receive pulse in the same direction through the two apertures of A cores, and by applying an information-inverting pulse in opposite directions through the two apertures of A cores. Information is transferred from A cores to respective next-following B cores by applying an electrical transmit pulse in the same direction through the two apertures of A cores, by applying an opposite-polarity electrical receive pulse in the same direction through the two apertures of B cores, and by applying an information-inverting pulse in opposite directions through the two apertures of B cores. The information-inverting pulses supply signal-transfer energy to the shift register in a way which provides unity gain or amplification of information signal amplitude as the information signal propagates through the register. The magnetic shift register is capable of operating at a shift rate of 10 megacycles to provide an information transfer rate of 5 megacycles.

Figure 1:
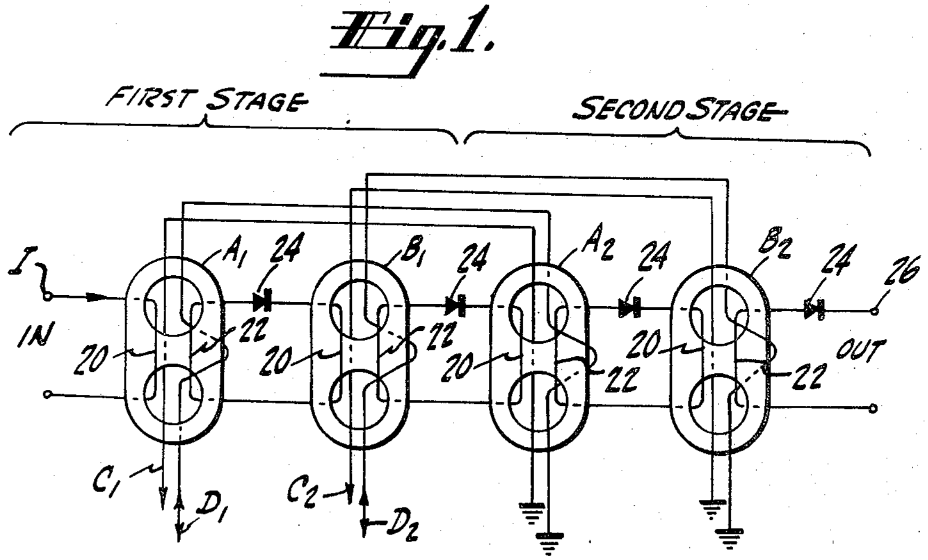
FIG. 1 is a diagram of an illustrative magnetic shift register having two information-bit stages including two magnetic cores per stage.

Reference is now made in greater detail to the illustrative shift register shown in FIG. 1. The first stage of the shift register includes magnetic cores $A_1$ and $B_1$; the second stage of the shift register includes magnetic cores $A_2$ and $B_2$. A shift register constructed according to the invention may include any desired number of similar stages in accordance with the desired number of information bits to be stored in the register. The magnetic cores are preferably made of a ferrite material having a generally square hysteresis loop characteristic. The magnetic cores as oriented in the drawing have an upper aperture and a lower aperture. The apertures define an upper magnetic leg, a central magnetic leg and a lower magnetic leg. The upper and lower legs have the same cross sectional area, and the central magnetic leg has a cross sectional area equal to twice the cross sectional area of the upper leg or the lower leg.

Each magnetic core provides one elemental magnetic storage region around the upper aperture and a second elemental magnetic storage region around the lower aperture. The magnetic cores need not be discrete magnetic elements but may, if desired, be constructed from a sheet of magnetic material in which the magnetic material surrounding each pair of apertures constitutes a two-aperture "core." Further, the magnetic sheet may be molded around electrical conductors so that the space occupied by the imbedded conductors constitute the "apertures" in the magnetic cores. The magnetic cores and electrical windings may be constructed by known laminated ferrite techniques to provide the cores, apertures and windings within the meanings of the words as used herein.

Each magnetic core is provided with an input winding 20 which passes in opposite directions or differentially through the two apertures of the core. Each core is also provided with an output winding 22 which passes in opposite directions or differentially through the two apertures of the core. Each output winding 22 is preferably a two-turn winding, whereas each input winding 20 may be a single-turn winding. The output winding 22 of each core except the last core is connected to the input winding 20 of the following core to provide an information transfer winding. Each information transfer winding path includes a unidirectional current conductive device 24 which is preferably a tunnel rectifier or a tunnel diode poled in a direction to pass current from a transmitting core to a receiving core.

A receive-transmit drive winding $D_1$ passes in the same direction through the two apertures in the $A_1$ core and passes in the same direction through the two apertures of the $A_2$ core. A second receive-transmit drive winding $D_2$ passes in the same direction through the two apertures in the $B_1$ core and passes in the same direction through the two apertures in the $B_2$ core.

A signal-inverting winding $C_1$ passes in opposite directions or differentially through the two apertures in the $A_1$ core and passes in opposite directions or differentially through the two apertures in the $A_2$ core. A second signal-inverting winding $C_2$ passes in opposite directions or differentially through the two apertures of the $B_1$ core and passes in opposite directions or differentially through the two apertures in the $B_2$ core. The direction of positive or conventional current flow in the various windings is indicated by the respective arrows.

The input winding 20 of the first core $A_1$ is provided with an input terminal I to which binary digital information input signals are applied. The input signals may include a current pulse to represent a 1 information bit, and the absence of a current pulse to represent a 0 information bit. Information bits propagated through the shift register become available at an output terminal 26.

Figure 2:
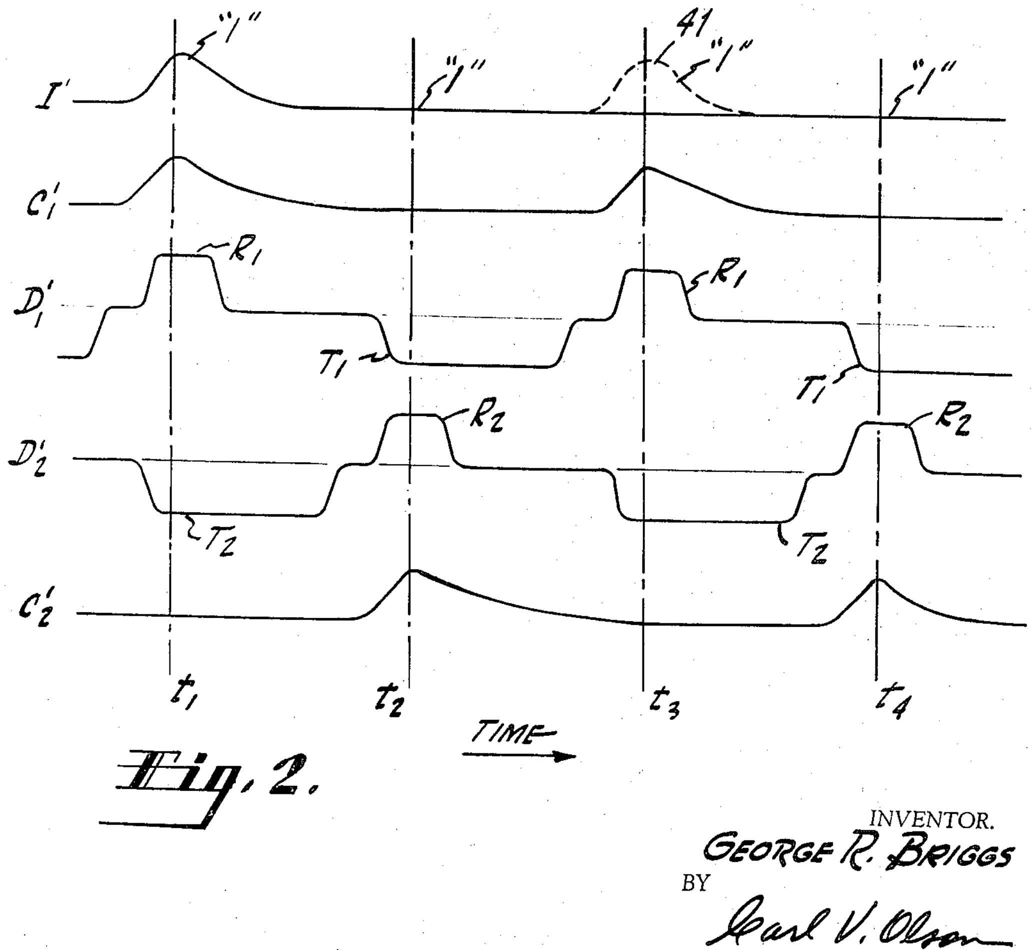
FIG. 2 is a chart of electrical signal waveforms which will be referred to in describing the operation of the shift register of FIG. 1.

The drive winding $D_1$ is connected to a source of drive signals having receive pulses $R_1$ and opposite-polarity transmit pulses $T_1$ as shown by the waveform $D_1'$ in FIG. 2. The second drive winding $D_2$ is connected to a source of drive signals having receive pulses $R_2$ and opposite-polarity transmit pulses $T_2$ as shown by the waveform $D_2'$ in FIG. 2. The first information-inverting winding $C_1$ is connected to a source of information-inverting pulses as shown by the waveform $C_1'$ of FIG. 2. The second information-inverting winding $C_2$ is connected to a source of information-inverting pulses as shown by the waveform $C_2'$ of FIG. 2.

Figure 3:
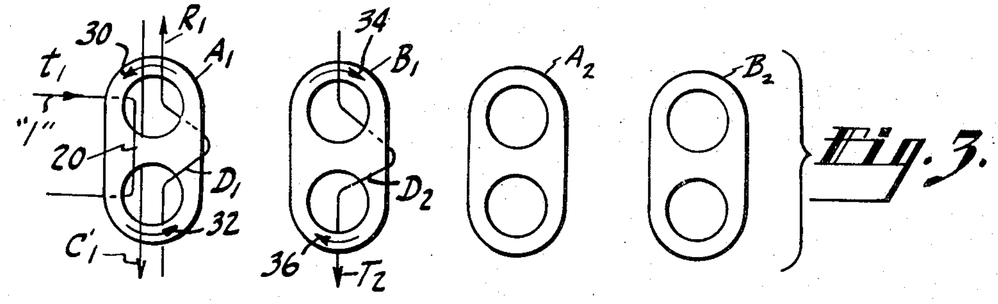
FIGS. 3, 4, 5 and 6 are diagrams illustrating electrical and magnetic conditions existing in the shift register of FIG. 1 at the four successive times designated $t_1$, $t_2$, $t_3$ and $t_4$ in FIG. 2.

References will now be made to FIGS. 2 through 6 for a description of the operation of the shift register of FIG. 1 in the receipt of a 1 information signal bit and the propagation of the 1 information signal bit through the shift register. Waveform I' shows the application at time $t_1$ of a 1 information bit to the input terminal I and input winding 20 of the first magnetic core $A_1$. The conditions which are particularly important for an understanding of the operation at time $t_1$ are shown in FIG. 3. At time $t_1$, a receive pulse $R_1$ having the direction shown in FIG. 3 is applied to the drive winding $D_1$. The effect of the receive signal $R_1$ passing in the same direction through the two apertures of the core $A_1$ is to produce equal counterclockwise magnetic fluxes 30 and 32 about the upper and lower apertures of the core. At the same time $t_1$, an information-inverting pulse $C'_1$ is applied in the direction shown through the information-inverting winding $C_1$. The effect of the information-inverting pulse $C'_1$ is to cancel the effect of the input information signal 1 applied to the input winding 20. Stated another way, the information-inverting pulse $C'_1$ inverts the input information signal 1. (If, on the other hand, the input signal had been the absence of a pulse to represent an input information signal 0, the information-inverting pulse $C'_1$ would have been effective to unbalance the fluxes 30 and 32 around the two apertures.) Also, at time $t_1$, a transmit pulse $T_2$ is applied in the direction shown to drive winding $D_2$ of the $B_1$ core to produce equal clockwise fluxes 34 and 36 around the two apertures of core $B_1$. FIG. 3 shows the magnetic conditions in cores $A_1$ and $B_1$ at time $t_1$ when the input signal 1 is transferred to and stored in core $A_1$.

FIG. 3, being a simplified representation, does not include all the windings of the shift register of FIG. 1. The output winding 22 on core $A_1$ is not shown because the currents induced in the output winding due to the switching of balanced fluxes 30 and 32 cancel in the output winding and are thus not coupled to the core $B_1$. The input and output windings on core $B_1$ are omitted for the same reason in relation to balanced fluxes 34 and 36. All the windings on cores $A_2$ and $B_2$ are omitted from FIG. 3 because their operation will be described later in connection with FIGS. 5 and 6. However, it should be understood that at the same time $t_1$ when information is received by core $A_1$ from the input terminal I, information is received by core $A_2$ from core $B_1$. Also, at the same time $t_2$, to be described, when information is received by core $B_1$ from core $A_1$, information is received by core B, from core $A_2$. Time $t_1$ (and time $t_3$) is a B-to-A information transfer time, and time $t_2$ (and time $t_4$) is an A-to-B information transfer time.

Figure 4:
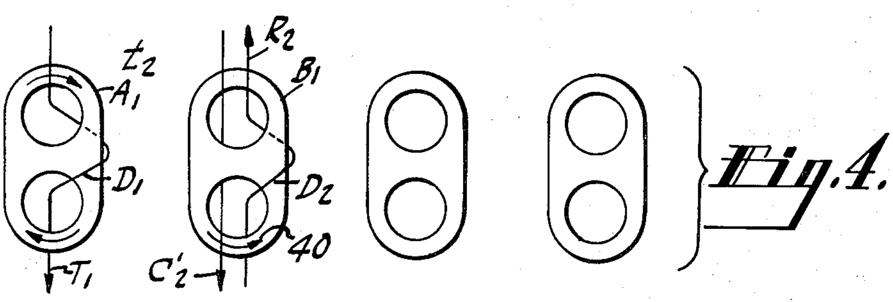

The actions occurring at time $t_2$ in FIG. 2 are illustrated in FIG. 4. At time $t_2$, information stored in core $A_1$ is transferred to the following core $B_1$. A receive pulse $R_2$ applied through the drive winding $D_2$ tends to cause equal counterclockwise fluxes around both of the apertures in core $B_1$. At the same time, the information-inverting pulse $C'_2$ opposes the flux change around the upper aperture and aids the flux change around the lower aperture. Therefore, an unbalanced or differential flux 40 in the counterclockwise direction is established around the lower aperture only. The transmit pulse $T_1$ applied to drive winding $D_1$ of the first core $A_1$ does not result in the coupling of an electrical signal to the core $B_1$ because there were balanced fluxes 30 and 32 around the apertures of core $A_1$ as shown in FIG. 3. The switching of balanced fluxes 30 and 32 in core $A_1$ to the clockwise sense generates opposite polarity electrical signals in the output winding of core $A_1$ which cancel each other. The 1 information signal previously represented in core $A_1$ by balanced fluxes 30 and 32 is now represented by a differential or unbalanced flux 40 in core $B_1$.

Figure 5:
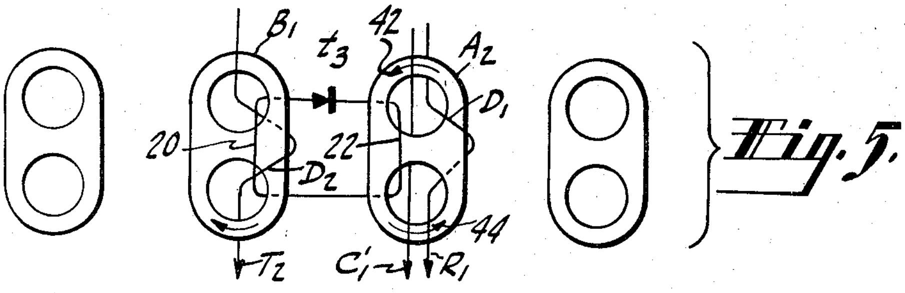

FIG. 5 shows the conditions at time $t_3$ when a transmit pulse $T_2$ is applied to drive winding $D_2$ of core $B_1$, a receive pulse $R_1$ is applied to the drive winding $D_1$ of core $A_2$, and an information-inverting pulse $C'_1$ is applied to the core $A_2$. The switching of the unbalanced flux 40 previously existing around the lower aperture of core $B_1$ causes the induction of a differential or unbalanced electrical signal in the information transfer winding loop 20, 22. The effect of the information signal pulse 41 passing through input winding 22 of core $A_2$ is cancelled by the information-inverting pulse $C'_1$. Therefore, core $A_2$ is affected solely by the receive pulse $R_1$ which establishes balanced magnetic fluxes 42 and 44 around the two apertures in core $A_2$. The balanced fluxes 42 and 44 represent the storage of the original 1 information bit in the core $A_2$.

Figure 6:
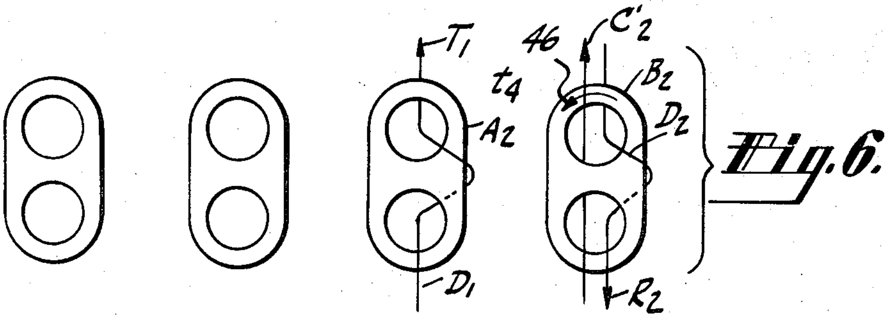

The effects occurring at time $t_4$ in FIG. 2 are represented in FIG. 6. A transmit pulse $t_1$ is applied through drive winding $D_1$ of core $A_2$, a receive pulse $R_2$ is applied through the drive winding $D_2$ of core $B_2$, and an information-inverting pulse $C'_2$ is applied through the information-inverting winding $C_2$ of core $B_2$. Since the fluxes 42 and 44 previously existing in core $A_2$ were balanced, no electrical information signal is coupled from core $A_2$ to core $B_2$. A differential or unbalanced flux 46 is established around the upper aperture in core $B_2$ by the differential effect of the information-inverting pulse $C'_2$. The switching of the unbalanced flux 46 does not result in the coupling of a disturbance back to core $A_2$ because of the blocking action of the diode 24. The unbalanced flux 46 represents the storage in core $B_2$ of the original 1 information bit. At the next following time in the cycle, which would be at a time $t_5$, the 1 information bit stored in core $B_2$ is supplied to the output terminal 26 of the shift register as an electrical signal pulse.

Although the shift register has been described as including two stages each having two cores, any number of stages may be employed. Each stage includes one A core and one B core. Two cycles of drive and inverting pulses are required for transferring information from one stage to the next. During the B-to-A cycle, the information in each B core is transferred to the A core in the next following stage. During the A-to-B cycle, the information in each A core is transferred to the B core in the same stage.

In the operation of the shift register, the major portion of the energy required for transferring an information signal bit from one core to the next core is supplied from the information-inverting pulse source. The information signal is maintained in amplitude, or is amplified, and does not decay or "run-down" as it is successively propagated from core to core through the shift register. In the arrangement according to the invention, an information signal bit is inverted every time it passes from one core to the next-following core. When there are an even number of cores, the information signal bit emerges from the last core with the same pulse or no-pulse character it had at the input of the first core.

What is claimed is:

1. The combination of at least one set of two magnetic cores A and B, each core having at least two apertures, information transfer means coupling electrical information signals from the aperture of a core to the aperture of a following core, means to apply an electrical transmit pulse through apertures of B cores, and means to apply an information-inverting pulse through apertures of A cores, whereby information in B cores is inverted and transferred to A cores, and means to apply an electrical transmit pulse through apertures of A cores, and means to apply an information-inverting pulse through apertures of B cores, whereby information in A cores is inverted and transferred to B cores.

2. The combination of at least one set of two magnetic cores A and B, each core having at least two apertures, information transfer means coupling electrical information signals from an aperture of a core to an aperture of a following core, means to apply an electrical transmit pulse through apertures of B cores, means to apply an opposite-polarity electrical receive pulse through apertures of A cores, and means to apply an information-inverting pulse through apertures of A cores, whereby information in B cores is inverted and transferred to A cores, and means to apply an electrical transmit pulse through apertures of A cores, means to apply an opposite-polarity electrical receive pulse through apertures of B cores, and means to apply an information-inverting pulse through apertures of B cores, whereby information in A cores is inverted and transferred to B cores.

3. A magnetic shift register comprising at least one set of two magnetic cores A and B, each core having two apertures each core having two information-indicating magnetic states in which equal or differential magnetic fluxes surround the two apertures in the core, information transfer means coupling electrical information signals differentially from the two apertures of a core to the two apertures of a following core, means to apply an electrical transmit pulse similarly through the two apertures of B cores, means to apply an opposite-polarity electrical receive pulse similarly through the two apertures of A cores, and means to apply an information-inverting pulse differentially through the two apertures of A cores, whereby information in B cores is inverted and transferred to A cores, and means to apply an electrical transmit pulse similarly through the two apertures of A cores, means to apply an opposite-polarity electrical receive pulse similarly through the two apertures of B cores, and means to apply an information-inverting pulse differentially through the two apertures of B cores, whereby information in A cores is inverted and transferred to B cores.

4. The combination of at least one set of two magnetic cores A and B, having two apertures each core having two information-indicating magnetic states in which equal or differential magnetic fluxes surround the two apertures in the core, information transfer windings, said windings each including a conductive path extending in different directions through the two apertures of a core and in different directions through the two apertures of a following core, first winding and driver means for transferring information from B cores and to A cores, said means being constituted by means to apply an electrical transmit pulse in the same direction through the two apertures of B cores, and means to apply an information-inverting pulse in opposite directions through the two apertures of A cores, and second winding and driver means for transferring information from A cores and to B cores, said second means being constituted by means to apply an electrical transmit pulse in the same direction through the two apertures of A cores, and means to apply an information-inverting pulse in opposite directions through the two apertures of B cores.

5. A magnetic shift register comprising at least one set of two magnetic cores A and B, each core having two apertures each core having two information-indicating magnetic states in which equal or differential magnetic fluxes surround the two apertures in the core, information transfer windings, said windings each including a conductive path extending in different directions through the two apertures of a core and in different directions through the two apertures of a following core, first winding and driver means for transferring information from B cores and to A cores, said means being constituted by means to apply an electrical transmit pulse in the same direction through the two apertures of B cores, means to apply an opposite-polarity electrical receive pulse in the same direction through the two apertures of A cores, and means to apply an information-inverting pulse in opposite directions through the two apertures of A cores, and second winding and driver means for transferring information from A cores and to B cores, said second means being constituted by means to apply an electrical transmit pulse in the same direction through the two apertures of A cores, means to apply an opposite-polarity electrical receive pulse in the same direction through the two apertures of B cores, and means to apply an information-inverting pulse in opposite directions through the two apertures of B cores.

6. A magnetic shift register comprising at least one set of two magnetic cores A and B, each core having two apertures each core having two information-indicating magnetic states in which equal or differential magnetic fluxes surround the two apertures in the core, information transfer windings, said windings including an input winding for coupling electrical information signals differentially through the apertures of the first core, inter-core windings for coupling differential electrical signals from the two apertures of each core to the two apertures of the next core, and an output winding for coupling an output signal differentially from the two apertures of the last core, first winding and driver means for transferring information from B cores and to A cores, said means being constituted by means to apply an electrical transmit pulse in the same direction through the two apertures of B cores, means to apply an opposite-polarity electrical receive pulse in the same direction through the two apertures of A cores, and means to apply an information-inverting pulse in opposite directions through the two apertures of A cores, and second winding and driver means for transferring information from A cores and to B cores, said second means being constituted by means to apply an electrical transmit pulse in the same direction through the two apertures of A cores, means to apply an opposite-polarity electrical receive pulse in the same direction through the two apertures of B cores, and means to apply an information-inverting pulse in opposite directions through the two apertures of B cores.

7. A magnetic shift register comprising at least one set of two magnetic cores A and B, each magnetic core having two apertures, an input winding on each core passing in opposite directions through the two apertures of the core, an output winding on each core passing in opposite directions through the two apertures of the core, means coupling the output winding of one core to the input winding of the next following core, a drive winding on each core passing in the same direction through the two apertures of the core, means operative at a B-to-A transfer time to apply a receive pulse to the drive windings of the A cores and to apply an opposite-polarity transmit pulse to the drive windings of the B cores, means operative at an A-to-B transfer time to apply a receive pulse to the drive windings of the B cores and to apply an oppoiste-polarity transmit pulse to the drive windings on the A cores, an information inverting winding on each core passing in opposite directions through the two apertures of the core, means operative at the B-to-A transfer time to apply an information inverting pulse to the information inverting windings on A cores, means operative at the A-to-B transfer time to apply an information inverting pulse to information inverting windings on B cores, and means operative at the B-to-A transfer time to apply an input information pulse to the input winding of the first one of said A cores.

References Cited

UNITED STATES PATENTS 3,213,435 10/1965 Bruce -------------- 340—174

TERRELL W. FEARS, *Primary Examiner.*

R. MORGANSTERN, *Assistant Examiner.*